June 28, 1927.

W. C. GOODWIN 1,633,938

SYNCHRONOUS MOTOR STARTER

Filed July 30. 1920

WITNESSES:
J. A. Helsel
J. R. Langley

INVENTOR
Walter C. Goodwin.
BY
Chesley G. Carr
ATTORNEY

Patented June 28, 1927.

1,633,938

UNITED STATES PATENT OFFICE.

WALTER C. GOODWIN, OF PITTSBURGH, PENNSYLVANIA, ASSIGNOR TO WESTINGHOUSE ELECTRIC & MANUFACTURING COMPANY, A CORPORATION OF PENNSYLVANIA.

SYNCHRONOUS-MOTOR STARTER.

Application filed July 30, 1920. Serial No. 400,141.

My invention relates to motor starters, and it has particular relation to systems for automatically starting synchronous motors.

My invention has for its object to provide a simple and efficient arrangement for automatically effecting the acceleration of synchronous motors to synchronous speed and for insuring the maintenance of running connections after they have been established.

It has been observed, in connection with experiments to determine the various characteristics of synchronous motors, that, if the field circuit of such motor is closed during the starting operation, the circuit is traversed by current of substantially constant value while the motor is accelerating from zero to substantially synchronous speed. The value of the current drops suddenly to substantially zero when the motor reaches synchronous speed.

The value of the current is substantially constant by reason of the fact that the reactance of the field circuit is relatively high while its resistance is relatively low. The electromotive force induced in the field-magnet winding by the transformer action of the motor decreases as the motor approaches synchronism by reason of the increased speed of the motor. This decrease is compensated for by the decrease in reactance because of the lower frequency of the field current. Accordingly, the decrease in the electromotive force does not operate to cause a corresponding decrease in the value of the current and the latter remains substantially constant, as set forth above.

It has been found, also, that, when the running connections are established to apply normal voltage to the primary winding of the motor, there is induced in the field circuit a wave of electromotive force of such amplitude as to effect the opening of switches for controlling the field circuit. This sudden variation in the value of the electromotive force, or "inductive kick", as it may be termed, effects the temporary de-energizing of such actuating coils as are connected in circuit with the field-magnet winding of the motor.

In a copending application of Chester W. Drake, Serial No. 389,597, filed June 17, 1920, "Synchronous motor starters", it has been proposed to control the connection of the usual exciter to the field magnet winding and to simultaneously effect the establishing of running connections for the motor by means of a lockout switch. The lockout switch is provided with a closing coil which may be in circuit with the exciter or other source of energy and a lockout coil that is in series with the field magnet winding of the motor.

The lockout coil, which is energized by alternating current of substantially constant value until the condition of synchronism is reached, retains the controlling switch in its open position until the motor has reached synchronism. The current traversing the field circuit then falls to substantially zero value and the switch closes to connect the source of exciting current to the field-magnet winding and to establish running connections for the motor.

According to the present invention, I provide an auxiliary switch for controlling the circuit of the energizing coil of the transfer relay for effecting the change from starting connections to running connections for the motor. The transfer relay in closing completes a holding circuit for its actuating coil. The transfer relay remains closed and is not affected by the position of the auxiliary relay in case the latter opens upon the establishing of running connections. The opening of the auxiliary relay may occur under such conditions by reason of the fact that its actuating coil is connected to the exciter circuit and is, therefore, in circuit with the field-magnet winding. Inductive disturbances in the field circuit accordingly affect the operation of the auxiliary relay only.

In the accompanying drawings.

Figure 1:
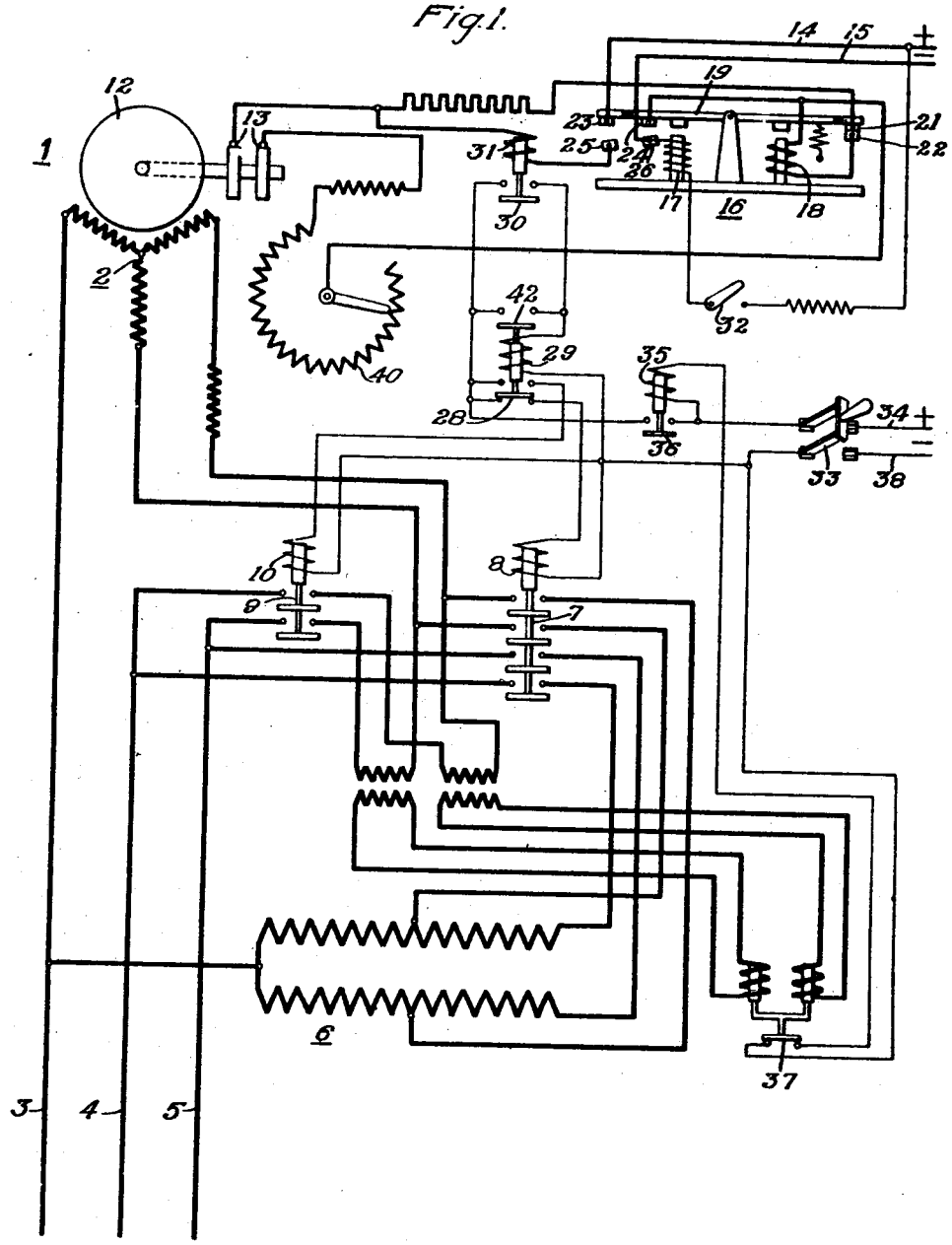
Figure 1 is a diagrammatic view of circuits in apparatus embodying my invention.

Referring particularly to Fig. 1, an alternating-current motor 1 of the synchronous type has a primary winding 2 that is supplied with energy by means of line conductors 3, 4 and 5, which may be connected to any suitable source of alternating current. Auto-transformers 6 supply energy at low voltage during the starting operation.

The starting connections of the motor are controlled by an electromagnetic switch 7 having an actuating coil 8. The running connections of the motor are controlled by an electromagnetic switch 9 having an actuating coil 10.

The field-magnet winding of the motor, which is carried by the rotor 12, is connected by means of slip rings 13 to any suitable source of direct current, such, for example, as the usual exciter generator. The nature of the source is, however, immaterial and line conductors 14 and 15 may be connected to any suitable source of direct current energy.

The field circuit connections are controlled by an electromagnetic switch 16 of the so-called "lockout" type. The switch 16 comprises a closing coil 17 that is energized from the circuit represented by conductors 14 and 15. The switch is provided, also, with a lockout coil 18 that is in series with the field-magnet winding during the starting operation of the motor. During such period, the switch is held in its open position. A pivotally mounted armature member 19, upon which opposing forces are exerted by the respective coils 17 and 18, carries a movable contact member 21 which coacts with a contact member 22 to close the circuit of the field magnet winding when the switch is in its open position.

The armature member 19 carries, also, movable contact members 23 and 24, which respectively coact with contact members 25 and 26 to complete the normal field circuit of the motor and to control the establishing of the running connections of the motor when the switch is closed. The circuits of actuating coils 8 and 10 of the switches 7 and 9 are controlled by a transfer relay 28 having an actuating coil 29. The circuit of the latter coil is controlled by an auxiliary relay 30. The auxiliary relay has an actuating coil 31, the circuit of which is controlled by contact members 23 and 25.

It may be assumed that the motor 1 is at rest and that the various switches occupy their respective illustrated positions. It may be assumed further that a manually operable switch 32 has been closed to complete the circuit of closing coil 17 of the switch 16. It will be understood that, if the usual direct-connected exciter generator supplies current to the field-magnet winding, no electromotive force is applied to the coil 17 until the motor rotates. In case a source of substantially constant electromotive force is employed, the switch 32 will not be closed until after the starting switch 7 has closed.

To start the motor, a manually operable switch 33, which is illustrated as of the knife-blade type, is closed to energize the control circuits of the system. Current then traverses a circuit which extends from conductor 34 through switch 33, actuating coil 35 of the low-voltage relay 36, overload relay 37 and switch 33 to line conductor 38. The low-voltage relay 36 closes to complete a circuit for the actuating coil 8 of switch 7. This circuit extends from conductor 34 through low-voltage relay 36 and transfer relay 28, which is in its lower position, and coil 8 to conductor 38. The switch 7 then closes to establish starting connections for the motor. The primary winding 2 is connected to low voltage taps of the auto-transformers 6 and current is supplied to the motor at reduced voltage.

A relatively high electromotive force is generated in the field circuit by reason of the relative movement between the rotating flux of the armature and the initially stationary field-magnet winding. The circuit of the latter is closed at contact members 21 and 22 and the series lockout coil 18, which is included in the field circuit, is energized to retain the armature 19 of the switch 16 in its open position.

The motor operates substantially as an induction motor, the field-magnet winding constituting a secondary winding with its circuit closed and disconnected from the exciter or other source of direct current. When the motor reaches substantially synchronous speed, the alternating current traversing the field circuit falls suddenly to substantially zero value. Accordingly, the lockout coil 18 is de-energized at this instant and the closing coil 17 effects the closing of the switch 16.

The contact members 23 and 24, respectively, engage the contact members 25 and 26 to complete a circuit which extends from conductor 14 through contact members 23 and 25, actuating coil 31 of auxiliary relay 30, slip rings 13 and field-magnet winding of the motor, rheostat 40 and contact members 24 and 26 to conductor 15. The closing of the circuit just described applies normal exciting voltage to the field-magnet winding of the motor.

When the current traversing the field circuit reaches a predetermined value, the coil 31 is energized to close auxiliary relay 30 and the latter completes a circuit which extends from conductor 34 through switch 33, low-voltage relay 36, auxiliary relay 30, actuating coil 29 of transfer relay 28 and switch 33 to conductor 38.

The transfer relay is actuated to its upper position to open the circuit of actuating coil 8 of starting switch 9 and to close the circuit of the actuating coil 10 of running switch 9. The switch 7 opens to disconnect the motor from the auto-transformers 6 and the switch 9 closes to effect the direct connection of the line conductors 3, 4 and 5 to the motor. The motor now operates under normal running conditions with load voltage applied to the primary winding 2 and the normal exciter voltage applied to the field-magnet winding.

The increase in the value of the applied voltage incident to the change in primary connections induces an electromotive force in the field circuit which temporarily opposes that of the exciting source and which may be of such value as to partially or entirely de-energize the actuating coil 31 of the relay 30 and thereby cause the latter to open. The opening of relay 30 does not, however, affect the openings of transfer relay 28 because an interlock 42 connected to the relay closes the holding circuit of the coil 29 when the relay is actuated to its open position. The interval of time between the respective operations of the auxiliary relay 30 and of the transfer relay 28 is such as to insure that the transfer relay 28 is closed and that the holding circuit of the coil 29 is completed before the abnormal electromotive force induced in the field circuit effects the opening of the auxiliary relay 30.

The provision of an auxiliary relay and the arrangement whereby the transfer relay which is controlled thereby completes a holding circuit for its actuating coil effectually prevents the opening of the running connections of the motor, which might otherwise be caused by the above-mentioned inductive disturbance in the field circuit.

To stop the motor, it is only necessary to open the switch 33 and thereby disconnect the control circuits from the conductors 34 and 38. The switch 9 thereupon opens to disconnect the motor from the line. The transfer relay 28 falls to its lower position to partially complete the circuit of the coil 8 of starting switch 7 in anticipation of the next starting operation.

The switch 32 may be opened at any desired time thereafter to effect the opening of the field circuit by the switch 16. The opening of the switch 16 effects the closing of contact members 21 and 22 to close the field circuit in readiness for the successive starting operation.

By means of the arrangement recited above, it is possible to effect the automatic acceleration of a synchronous motor to synchronous speed and to connect it to the line at the proper instant. The entire operation may be initiated by the actuation of a single manually operable switch or push-button switch. The auxiliary relay and the holding circuit for the transfer relay insure that the normal connections of the motor are not disturbed by abnormal voltages in the field circuit which may be caused by the change of connections during the starting operation.

Figure 2:
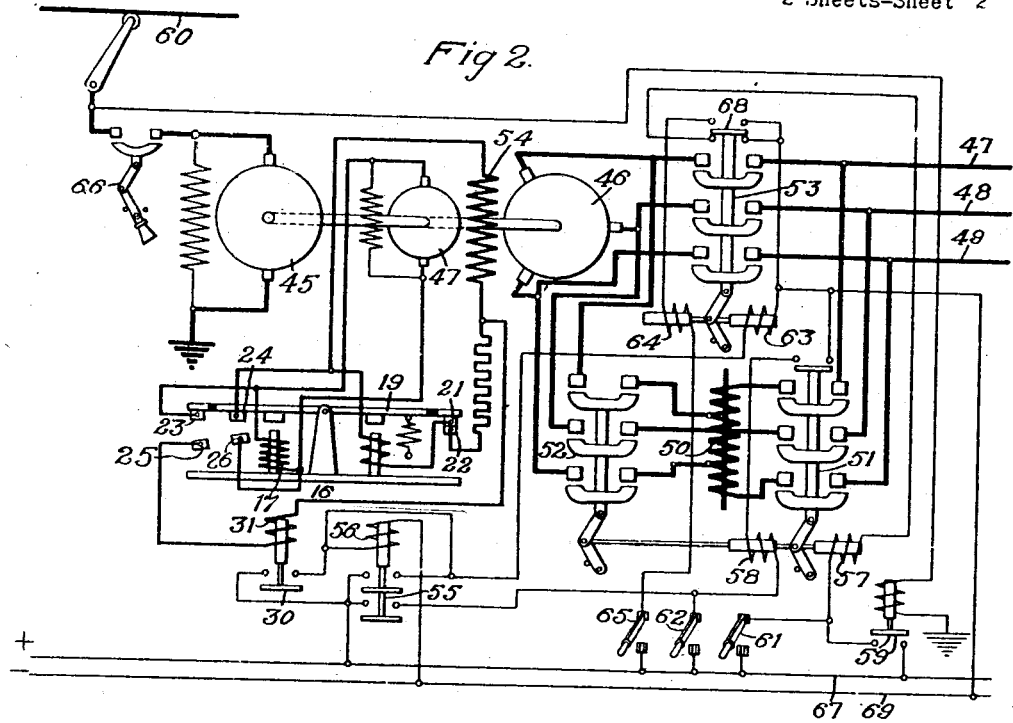
Figs. 2 and 3 are similar views illustrating my invention applied to systems of automatic substations.

Reference may now be had to Fig. 2, in which my invention is illustrated as applied to a system of control for an automatic substation such as may be employed in connection with electric railways or similar systems. The system differs principally from that described above in that its operation may be dependent upon voltage conditions of the trolley line to which it supplies energy and in that circuit interrupters are substituted for the usual electro-magnetic switches.

A direct-current generator 45 is direct-connected to a synchronous motor 46 and an exciter generator 47. The motor 46 is supplied with energy from line conductors 47, 48 and 49, which may be connected to any suitable source of alternating current. In starting, the motor is supplied with energy at reduced voltage through auto-transformers 50 and circuit interrupters 51 and 52. The circuit interrupters 51 and 52 are mechanically connected for simultaneous actuation. A circuit interrupter 53 controls the direct connection of the motor to the line.

The circuit of the field-magnet winding 54 of the motor is controlled by a lockout switch 16 corresponding in every respect to the switch 16 of Fig. 1. An auxiliary relay 30, having an actuating coil 31, and a transfer relay 55, having an actuating coil 56, are controlled by the lockout switch 16.

The circuit interrupters 51 and 52 have a closing coil 57 and a tripping coil 58. The coil 57 is controlled by a relay 59 that closes when the voltage of the trolley wire 60 falls to a predetermined value. The coil 57 may also be controlled by a manually operable switch 61. The tripping coil 58 is controlled by the transfer relay 55 or by a manually operable switch 62.

The circuit interrupter 53 is provided with a closing coil 63 that is controlled by a transfer relay 55 and a tripping coil 64 that is controlled by a manually operable switch 65.

It may be assumed that the apparatus is stationary and that a line circuit breaker 66 is open. It may be assumed, further, that the voltage of the trolley conductor 60 has fallen to a predetermined value at which the relay 59 closes. A circuit is completed, which extends from conductor 67, which may be connected to any suitable source of direct current, through relay 59, closing coil 57 of circuit interrupters 51 and 52 and interlock 68 of circuit interrupter 53 to conductor 69.

The circuit interrupters 51 and 52 close to connect the motor 46 to the line through the auto-transformers 50. The motor accelerates under the conditions described in connection with the system of Fig. 1. At the instant the motor reaches synchronous speed, the switch 16 closes to connect the exciter 47 in circuit with the field-magnet winding 54 of the motor. The closing of the switch 16 operates, also, to complete the circuit of actuating coil 31 of auxiliary relay 30 and the latter closes to effect the closing of transfer relay 55.

The closing of the transfer relay 55 effects the energizing of tripping coil 58 of circuit interrupters 51 and 52 and the latter are, accordingly, opened. The transfer relay, at the same time, completes a circuit for the closing coil 63 of circuit interrupter 53 and the latter closes to complete the running connections of the motor.

The line circuit breaker 66 is then closed at any desired time either manually or by any other suitable and well-known means, the details of such means constituting no part of the present invention.

The operation of the system may be discontinued upon the occurrence of any desired condition. In actual practice, automatic means are employed to effect the opening of the control circuits in accordance with operating conditions. Such means, however, constitute no part of the present invention and I have accordingly illustrated only a manually-operable switch 65 which, upon closing, completes a circuit for the tripping coil 64 of circuit interrupter 53. The circuit interrupter 53 opens to disconnect the motor 46 from the line. When the voltage of the exciter generator 47 falls to a predetermined value, the coil 17 of lockout switch 16 is de-energized to permit the opening of the switch 16. The low-voltage relay 30 opens to effect the opening of transfer relay 55 and the system is in readiness for the succeeding starting operation.

Figure 3:
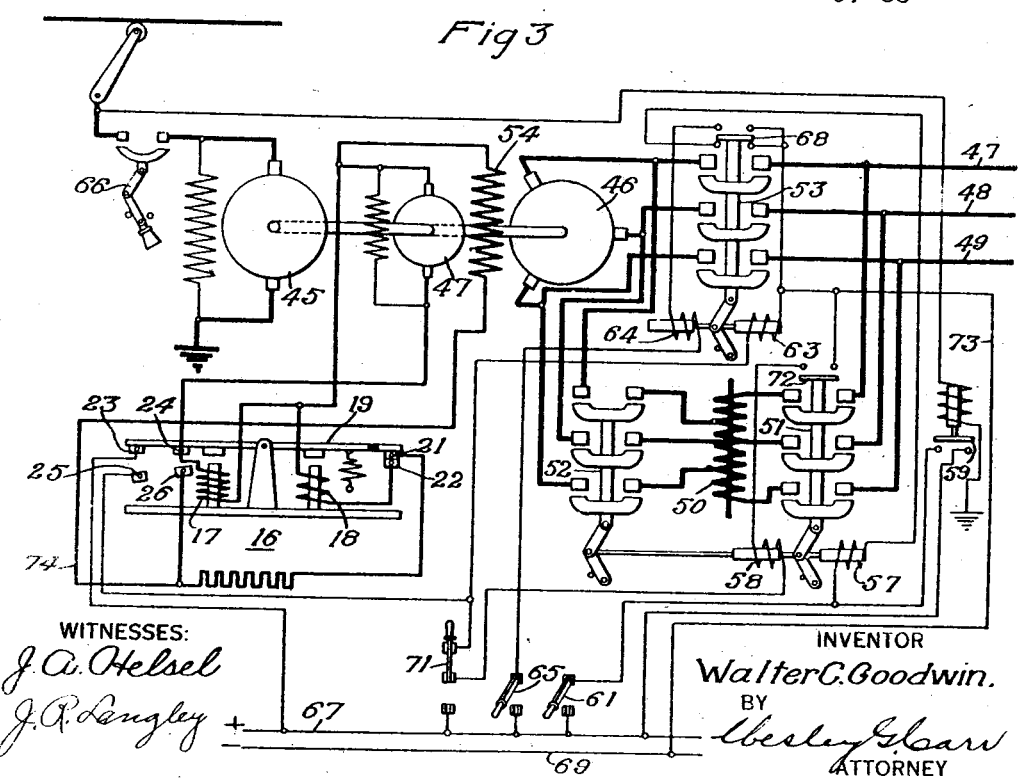

Reference may now be had to Fig. 3, in which a system somewhat similar to that of Fig. 2 is illustrated. The essential difference between the above-mentioned systems is that the auxiliary relay 30 and the transfer relay 55 of the system of Fig. 2 are omitted from the system of Fig. 3. The lockout switch 16 effects the operation of the several circuit interrupters directly instead of indirectly through relays.

The system is started as in the system of Fig. 2 by the closing either of the relay 59 or of the manually-operable switch 61. When the motor has accelerated to substantially synchronous speed, the lockout switch 16 closes in the manner previously described. The contact members 23 and 25 complete a circuit which extends from conductor 67 through contact members 23 and 25, switch 71, tripping coil 58 of circuit interrupters 51 and 52, interlock 72, and conductors 73 to conductors 69. The circuit interrupters 51 and 52 accordingly open.

A circuit is also completed by contact members 23 and 25 which extends through closing coil 63 of circuit interrupter 53 and conductor 73 to conductor 69. The circuit interrupter 53 closes to complete the normal operating circuit of the motor.

The closing of switch 16 effects, also, the engagement of contact members 24 and 26 to complete the field circuit of the motor 46 which extends from one terminal of the exciter generator 47, through field-magnet winding 54 and contact members 26 and 24 to the other terminal of the exciter generator.

To bring the system to rest, the switch 65 is actuated to its closed position to complete a circuit for the tripping coil 64 of circuit interrupter 53. The circuit interrupter 53 opens and the various circuits are de-energized as described in connection with the system of Fig. 2. The opening of circuit interrupters 51 and 52 during the starting operation may be accomplished by the actuation of switch 71 to its lower position to complete a circuit for the tripping coil 58. It is necessary that the switch 71 occupy its illustrated position in order that the lockout switch may effect the transition from starting connections to running connections.

It will be noted that by means of the arrangements above described, I am enabled to effect the automatic acceleration of a synchronous motor to substantially synchronous speed and to establish normal operating conditions for the motor. The provision of an auxiliary relay and the arrangement whereby the transfer relay completes a holding circuit for its actuating coil insures that the running connections of the motor are not opened upon the occurrence of abnormal conditions in the field circuit of the motor. By calibrating the auxiliary relay to any desired value of the field current, the closing of the running connections may be deferred until the field current is of any desired value.

It will be appreciated that, if full voltage is applied to the motor when the latter is under heavy load and the field-magnet winding is energized by current of relatively low value, the motor may not remain in synchronism. Under such conditions, it is necessary to repeat the starting operation. It will be impossible to effect the continued operation of the motor under such circumstances unless the conditions are changed.

I claim as my invention:

1. In a motor starter, the combination with a synchronous motor having a field-magnet winding, and starting and running primary connections for said motor, of means controlled in accordance with the value of the current traversing said winding during the starting operation for rendering said starting connections ineffective and said running connections effective and for preventing a change in said connections upon the occurrence of an inductive disturbance in said winding after the running connections have been completed.

2. In a motor starter, the combination with a synchronous motor having a field-magnet winding, and starting and running primary connections for said motor, of means controlled in accordance with the value of the current traversing said winding during the starting operation for rendering said starting connections ineffective and said running connections effective and for preventing a change in said connections upon the occurrence of an inductive disturbance in said winding after the running connections have been completed, said means comprising a circuit-controlling device, actuating and holding means therefor and a relay for controlling said actuating means.

3. In a motor starter, the combination with a synchronous motor having a field-magnet winding, and starting and running primary connections for said motor, of means controlled in accordance with the value of the current transversing said winding during the starting operation for rendering said starting connections ineffective and said running connections effective and for preventing a change in said connections upon the occurrence of an inductive disturbance in said winding after the running connections have been completed, said means comprising a circuit-controlling device, actuating and holding means therefor and a relay having an actuating coil in circuit with said field-magnet winding.

4. In a motor starter, the combination with a synchronous motor having a field-magnet winding, of means for automatically controlling the starting and the running connections for said motor in accordance with the value of the alternating current traversing said winding during starting, a relay for effecting a transfer in said connections, said means comprising a holding circuit for said relay, actuating means for said relay, and a relay having an actuating coil in circuit with said winding for controlling the actuating means of the first-named relay.

5. In a motor starter, the combination with a synchronous motor having a field-magnet winding and starting and running primary connections for said motor, of means for automatically effecting the establishing of starting connections, and means comprising a lockout switch and a plurality of successively operable relays for automatically effecting the transition from starting connections to running connections when the current traversing said field-magnet winding reaches a predetermined value.

In testimony whereof, I have hereunto subscribed my name this 21st day of July, 1920.

WALTER C. GOODWIN.